United States Patent
Chen (10) Patent No.: US 8,015,054 B2
(45) Date of Patent: Sep. 6, 2011

(54) METHOD AND SYSTEM FOR GENERATING RECOMMENDATIONS

(75) Inventor: Qiming Chen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2680 days.

(21) Appl. No.: 10/382,449

(22) Filed: Mar. 5, 2003

(65) Prior Publication Data

US 2004/0176966 A1    Sep. 9, 2004

(51) Int. Cl.
*G06Q 10/00* (2006.01)
(52) U.S. Cl. .................................... 705/7.29; 705/7.31
(58) Field of Classification Search .................. 705/7.29, 705/7.31
See application file for complete search history.

(56) References Cited

U.S. PATENT DOCUMENTS

| | | | |
|---|---|---|---|
| 6,430,545 B1 * | 8/2002 | Honarvar et al. | 706/47 |
| 6,643,646 B2 * | 11/2003 | Su et al. | 707/6 |
| 6,662,195 B1 * | 12/2003 | Langseth et al. | 707/200 |
| 6,684,206 B2 * | 1/2004 | Chen et al. | 707/3 |
| 6,721,750 B1 * | 4/2004 | Jones et al. | 707/100 |
| 6,741,980 B1 * | 5/2004 | Langseth et al. | 707/2 |
| 6,750,864 B1 * | 6/2004 | Anwar | 345/440 |
| 6,836,773 B2 * | 12/2004 | Tamayo et al. | 707/6 |
| 7,117,208 B2 * | 10/2006 | Tamayo et al. | 707/6 |
| 7,171,427 B2 * | 1/2007 | Witkowski et al. | 707/104.1 |
| 2004/0103092 A1 * | 5/2004 | Tuzhilin et al. | 707/3 |

OTHER PUBLICATIONS

Goil, Sanjay and Choudhary, Alok. High performance data mining using data cubes on parallel computers. ECE Dept. and CPDC, Northwestern Univ.*
Chen, Qiming. Dayal, Umesh. Hsu, Meichun. OLAP-based Scalable Profiling of Customer Behavior. HP Labs, Hewlett-Packard. 1999.*
Chen, Qiming. Dayal, Umesh. Hsu, Meichun. A Distributed OLAP Infrastructure for E-Commerce. Software Technology Laboratory. HP Laboratories. Palo Alto, CA.*
Qiming, Chen; Umesh, Dayal; Melchun, Hsu; A Distributed OLAP Infrastructure for E-Commerce. 1999.*

* cited by examiner

*Primary Examiner* — Johnna Loftis (57) ABSTRACT

A method and system for generating recommendations are described. The method of generating a recommendation list of products to a customer comprises using OLAP (On-Line Analytical Processing) to analyze raw data in a multilevel and multidimensional manner. Furthermore, the method includes applying a plurality of filtering processes to the raw data to generate a plurality of preliminary recommendation lists. Moreover, the method further comprises generating the recommendation list based on the plurality of preliminary recommendation lists.

20 Claims, 11 Drawing Sheets

FIG. 1

→ rec_cf cll 0.15 0.10
CUSTGRP: Men
CAT: Cloths
------------------------------- SEASON -------------------------------
------------------------------- Summer -------------------------------

| CUST 2 | SIMILARITY (CUST TARGET_CUST) | GRP_CUST | |
|---|---|---|---|
| c61 | 0.47 | Men | |
| c63 | 0.44 | Men | (Neighbors) |
| c67 | 0.15 | Men | |

***Products recommended to c11 based on dimensioned CF

| PROD | CFDEGREE | CAT_PROD |
|---|---|---|
| P_mcloth_11 | 1.00 | Cloths |

FIG. 2A

→ rec_cf c11 0.15 0.10  
CUSTGRP: Men  
CAT: Cloths

|  | ------------------------- SEASON ------------------------- | |
|  | ------------------------- Winter ------------------------- | |
| CUST 2 | SIMILARITY (CUST TARGET_CUST) | GRP_CUST |
| --- | --- | --- |
| c55 | 0.51 | Men |
| c57 | 0.41 | Men |
| c65 | 0.52 | Men |
| c75 | 0.62 | Men  (Neighbors) |
| c77 | 0.17 | Men |
| c93 | 0.19 | Men |
| c95 | 0.21 | Men |
| c97 | 0.20 | Men |
| c99 | 0.20 | Men |

***Products recommended to c11 based on dimensioned CF

| PROD | CFDEGREE | CAT_PROD |
| --- | --- | --- |
| P_mcloth_19 | 0.33 | Cloths |
| P_mcloth_17 | 0.22 | Cloths |
| P_mcloth_21 | 0.22 | Cloths |
| P_mcloth_13 | 0.11 | Cloths |
| P_mcloth_23 | 0.11 | Cloths |

FIG. 2B

→ rec_rf0 c11  0.30 0.08

| PROD2 | CONFDEGREE | SUPTDEGREE | CAT_PROD |
|---|---|---|---|
| P_wcloth_12 | 0.60 | 0.06 | Cloths |
| P_electr_08 | 0.56 | 0.05 | Electr |
| P_wcloth_14 | 0.50 | 0.05 | Cloths |
| P_mcloth_19 | 0.50 | 0.06 | Cloths |
| P_office_21 | 0.50 | 0.08 | Office |
| P_electr_06 | 0.44 | 0.04 | Electr |
| P_wcloth_10 | 0.40 | 0.04 | Cloths |
| P_mcloth_11 | 0.37 | 0.07 | Cloths |
| P_mcloth_23 | 0.33 | 0.01 | Cloths |

FIG. 3A

→ limit season to 'Winter'; limit cat to 'Cloths';
→ limit custgrp to 'Men'
→ rec_rf c11 0.15 0.08

| PROD2 | CONFDEGREE | SUPTDEGREE | CAT_PROD |
|---|---|---|---|
| P_mcloth_33 | 0.93 | 0.35 | Cloths |
| P_mcloth_35 | 0.86 | 0.32 | Cloths |
| P_mcloth_37 | 0.71 | 0.27 | Cloths |
| P_mcloth_39 | 0.64 | 0.24 | Cloths |
| P_mcloth_19 | 0.50 | 0.08 | Cloths |
| P_mcloth_23 | 0.50 | 0.08 | Cloths |
| P_mcloth_17 | 0.36 | 0.11 | Cloths |
| P_mcloth_21 | 0.20 | 0.05 | Cloths |

→ limit season to 'Winter'; limit cat to 'Cloths';
→ limit custgrp to 'Men'
→ rec_rf c11 0.15 0.10

| PROD | CFDEGREE | CAT_PROD |
|---|---|---|
| P_mcloth_19 | 0.33 | Cloths |
| P_mcloth_17 | 0.22 | Cloths |
| P_mcloth_21 | 0.22 | Cloths |
| P_mcloth_13 | 0.11 | Cloths |
| P_mcloth_23 | 0.11 | Cloths |

FIG. 5A

| → rec_rf c11 0.15 0.08 | | | |
| PROD2 | CONFDEGREE | SUPTDEGREE | CAT_PROD |
|---|---|---|---|
| P_mcloth_33 | 0.93 | 0.35 | Cloths |
| P_mcloth_35 | 0.86 | 0.32 | Cloths |
| P_mcloth_37 | 0.71 | 0.27 | Cloths |
| P_mcloth_39 | 0.64 | 0.24 | Cloths |
| P_mcloth_19 | 0.50 | 0.08 | Cloths |
| P_mcloth_23 | 0.50 | 0.08 | Cloths |
| P_mcloth_17 | 0.36 | 0.11 | Cloths |
| P_mcloth_21 | 0.20 | 0.05 | Cloths |

FIG. 5B

→ rec_fff  c11  0.15 0.10  0.15 0.08

| PROD | FFFDEGREE | CAT_PROD |
|---|---|---|
| P_mcloth_19 | 0.71 | Cloths |
| P_mcloth_13 | 0.62 | Cloths |
| P_mcloth_23 | 0.62 | Cloths |
| P_mcloth_17 | 0.32 | Cloths |
| P_mcloth_27 | 0.32 | Cloths |

FIG. 5C

→ rec_fff0  c11  0.10 0.10  0.30 0.08

| PROD | FFFDEGREE | CAT_PROD |
|---|---|---|
| P_electr_08 | 0.62 | Electr |
| P_mcloth_21 | 0.59 | Cloths |
| P_office_21 | 0.59 | Office |
| P_electr_06 | 0.46 | Electr |
| P_wcloth_12 | 0.43 | Cloths |
| P_mcloth_11 | 0.38 | Cloths |
| P_mcloth_19 | 0.31 | Cloths |
| P_office_29 | 0.27 | Office |
| P_wcloth_10 | 0.21 | Cloths |
| P_wcloth_14 | 0.21 | Cloths |
| P_office_27 | 0.21 | Office |

FIG. 6A

→ limit season to 'Winter'; limit cat to 'Cloths'
→ limit custgrp to 'Men'
→ rec_fff c11 0.15 0.10  0.15 0.08

| PROD | FFFDEGREE | CAT_PROD |
|---|---|---|
| P_mcloth_19 | 0.71 | Cloths |
| P_mcloth_13 | 0.62 | Cloths |
| P_mcloth_23 | 0.62 | Cloths |
| P_mcloth_17 | 0.32 | Cloths |
| P_mcloth_21 | 0.32 | Cloths |

FIG. 6B

METHOD AND SYSTEM FOR GENERATING RECOMMENDATIONS

BACKGROUND OF THE INVENTION

1. Field of the Invention

The present invention generally relates to generating recommendations. More particularly, the present invention relates to using several filtering processes to generate recommendations.

2. Related Art

In fields such as E-commerce, a recommendation system applies data analysis techniques to provide a list of top-N recommended items for a given customer. Many of these recommendation systems are based on any of the following filtering processes: collaborative filtering (CF), information filtering (IF), and association rule based filtering (RF).

Collaborative Filtering (CF) is used to identify a set of other customers with preferences similar to a given customer, known as his neighbors, and to generate a recommendation based on their opinions.

Information Filtering (IF) is used to generate recommendations solely based on the profiles expressing the given customer's needs or preferences. These profiles are built in terms of analyzing the content of items that the customer has rated, or summarizing the customer's shopping behavior. Each customer is dealt with individually.

Association Rule based Filtering (RF) uses the correlation between items to make predictions. For example, when TV->VCR is a strong cross-sale association rule (with confidence and support over certain thresholds), if a customer bought a TV, meaning that he supports this rule, then he will be recommended to buy a VCR.

A number of previous experimental studies show that a recommendation system based on CF, IF or RF alone has considerable limitations in accuracy and scalability.

A pure (or "flat") CF based recommendation system can be ineffective for several reasons. For example, prediction for the items with too few ratings cannot be provided (early rater problem); the similarity between many customers is low (sparsity problem); provide recommendations over all the customers and products is poorly focused; the causal relationships of customers' shopping activities (e.g., association rules) are missed.

A pure (or "flat") IF based recommendation system is less affected by the limitations of CF based recommendation systems since it is only sensitive to the items themselves rather than the correlation between customers. However, a pure IF based recommendation system is restricted to referring to items similar to those already rated or bought (over specification problem), and cannot perform well when lacking of content information and cross-reference.

A pure (or "flat") RF based recommendation system is also ineffective since many rules may not be relevant to the given customer. Moreover, selecting rules based on a fixed minimal support and confidence thresholds may lead to either too many or too few rules. Also, mining rules based on a large amount of customers involving a large set of products is very expensive.

Examples of the limitations of these "flat" recommendation systems will now be described. In the winter season, a man may be recommended with a woman's cloth for summer, if his shopping history in purchasing other products (e.g., office supply, electronics, etc.) is similar to some women. As another example, without limiting the prediction base, generating association rules in real-time for providing recommendations is almost impossible.

SUMMARY OF THE INVENTION

A method and system for generating recommendations are described. The method of generating a recommendation list of products to a customer comprises using OLAP (On-Line Analytical Processing) to analyze raw data in a multilevel and multidimensional manner. Furthermore, the method includes applying a plurality of filtering processes to the raw data to generate a plurality of preliminary recommendation lists. Moreover, the method further comprises generating the recommendation list based on the plurality of preliminary recommendation lists.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

The conventional recommendation systems based on Collaborative Filtering (CF), Information Filtering (IF) or Association Rule based Filtering (RF) alone have considerable limitations in accuracy and scalability.

Unlike the conventional recommendation systems, the recommendation system of the present invention enhances recommendation quality and enhances system scalability by limiting the base of prediction, i.e. generating recommendations with reduced base elements and focused targets.

The recommendation system of the present invention first focuses on dimensioning the base of prediction to provide Multilevel and Multidimensional (ML/MD) recommendations, such as to generate top-N recommended products in the 'cloths' category; in 'summer' season; or in 'cloths' category, 'summer' season, and customer group 'men'. This approach is based on multilevel and multidimensional CF, RF and IF.

In conventional "flat" collaborative filtering, the similarity between customers is determined using a similarity matrix (customer by customer) with each cell representing the similarity degree of a pair of customers. To support multilevel and multidimensional CF, the recommendation system of the present invention dimensions the similarity matrix by the feature dimensions (such as category, season, custgrp) to form a similarity cube. As the similarity matrix is dimensioned, each resulting slice (a smaller matrix) involves fewer amounts of customers and products, and all the slices can be manipulated in parallel. In this way, the computation cost for generating similarity measures and CF-based recommendations can be significantly reduced.

Conventional association rules are typically represented by two matrices (product by product), with each cell representing the confidence or support of a pair of associated products. To represent rules at multiple levels and in multiple dimensions, the recommendation system of the present invention dimensions these matrices by feature dimensions (such as season, category and custgrp) to form a confidence cube and a support cube.

In the recommendation system of the present invention, personal preferences can also be represented at multiple levels and in multiple dimensions.

The recommendation system of the present invention secondly focuses on mining association rules within the dimensioned neighborhoods of a given customer. These neighborhoods are identified in terms of ML/MD collaborative filtering in the following way. Given a customer $C_i$, apply CF to identify his neighbors, i.e. those with similar shopping behavior with $C_i$ and generate association rules within that neighborhood. Since rule mining is based on a limited neighborhood, its efficiency can be significantly enhanced, and the resulting rules are more relevant. Neighborhood oriented association rule mining represents a personalized integration of CF and RF at multiple levels and in multiple dimensions. The recommendation system of the present invention exhibits a performance that can meet the requirements of on-line prediction. Thus, the recommendation system of the present invention can provide recommendations on the fly for E-commerce applications.

In particular, the recommendation system of the present invention utilizes an OLAP (On-Line Analytical Processing) engine (e.g., Oracle Express). OLAP technology enables the support of multilevel and multidimensional recommendation, and enables integration of CF, IF and RF based filtering processes in personalized neighborhoods. The recommendation system of the present invention provides top-N recommended products in dimensioned scopes, such as over a particular product category, a season and a customer group, rather than over all of them.

Figure 1:
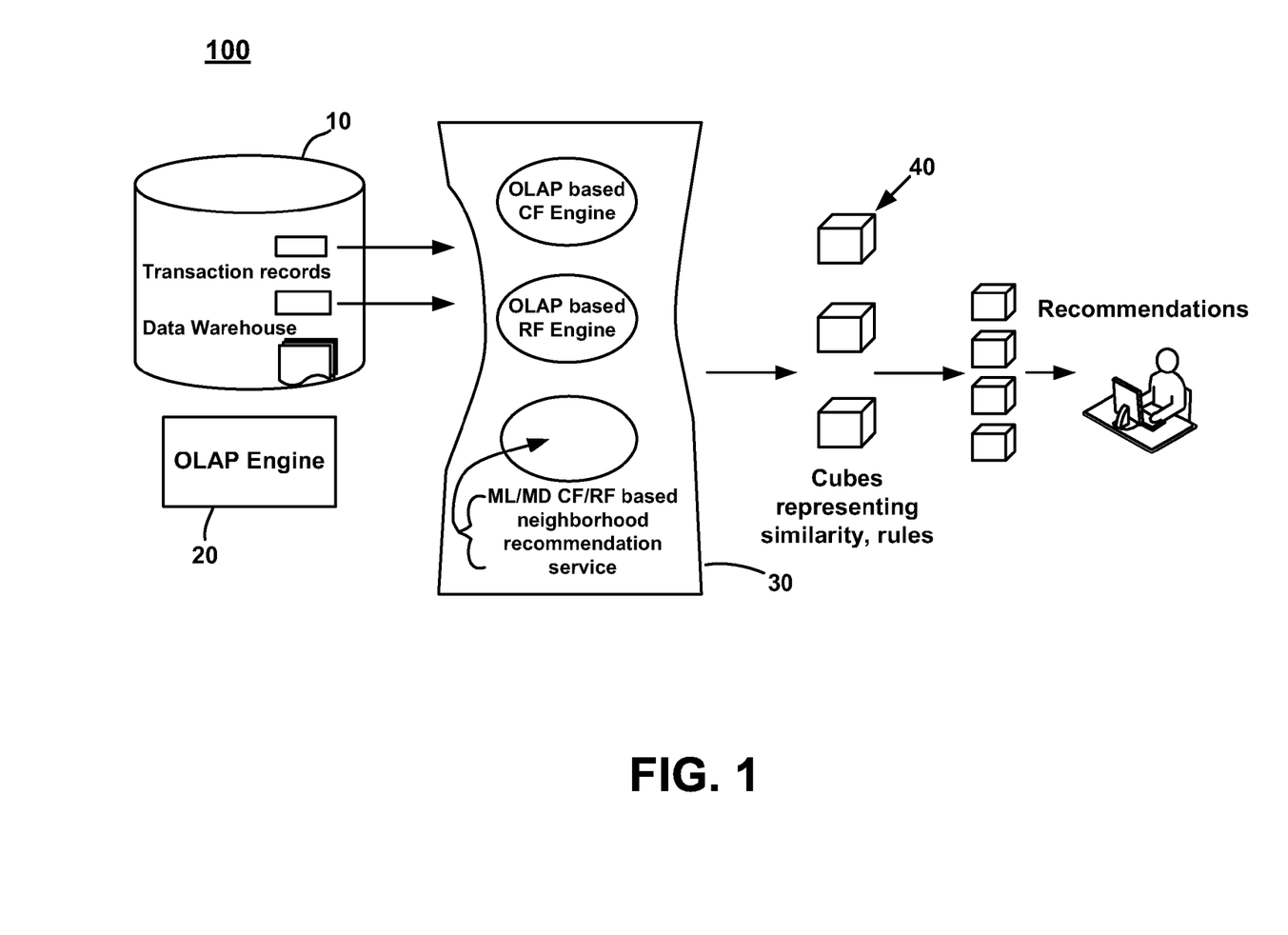
FIG. 1 illustrates a recommendation system in accordance with an embodiment of the present invention is illustrated in FIG. 1

A recommendation system 100 in accordance with an embodiment of the present invention is illustrated in FIG. 1. The recommendation system 100 comprises a data warehouse 10. For example, the data warehouse 10 can be the database of an e-commerce site having information about thousands of customers, products and purchase transactions. The raw transaction data is loaded into a multidimensional database 30. A OLAP engine (or server) 20, such as Oracle Express, controls the multidimensional database 30. The recommendation system 100 manipulates data cubes 40 as the basic data objects.

A cube C has a set of underlying dimensions $D_1, \ldots, D_n$, and is used to represent a multidimensional measure. Each cell of the cube C is identified by one value from each of the dimensions, and contains a value of the measure. Thus, it is said that the measure is dimensioned by $D_1, \ldots, D_n$. The set of values of a dimension D, called the domain of D, may be limited (an OLAP operation) to a subset. A sub-cube (slice or dice) can be derived from a cube C in terms of dimensioning C by a subset of its dimensions, and/or limiting the value sets of these dimensions. Dimensions may form hierarchy with values at different levels of abstraction. For example, a value of product dimension, 'Sony TV', can be mapped to a high-level value of category dimension, 'Electronics'. Further, a cube can be computed from other cubes with OLAP programming, namely, by executing programs written in an OLAP language, such as Oracle Express scripts.

In the recommendation system 100, the original data 10 are those representing customers' shopping history. The customer's shopping behavior is measured in multiple dimensions using a volume cube that is dimensioned, for example, by season, customer, product, etc. In designing the dimensions of the volume cube, the finest level of granularity at which to do perform the recommendation analysis is chosen. For instance, season has been chosen as the time granularity, even though the raw data records 10 contain time data at much finer granularity (e.g. day, hour, minutes). A record having fields whose values map to a list of element values of dimensions season, product and customer, is used to update the cell of the volume cube with the corresponding dimension elements. This mapping is referred to as binning. For example, '01May2001 9:45' is mapped to season "Spring". A transaction made by customer "Mary" at '01May2001 9:45' for purchasing "Sony TV" falls into the cell corresponding to customer='Mary', season='Spring' and product='Sony TV'.

From the volume cubes, several types of cubes for CF and RF analysis are derived. These cubes include a similarity cube, a confidence cube, and a support cube.

The similarity cube represents the similarity of customers shopping behavior and is used for CF analysis. A similarity cube is formed by further dimensioning the similarity matrices (customer×customer2), for comparing each pair of customers, by season, category and custgrp (customer group), and therefore has underlying dimensions customer, customer2 (a mirror dimension of customer), season, category and custgrp.

The confidence cube and support cube represent the strength of cross-sale association rules, are dimensioned by product and product2 (a mirror dimension of product), as well as season, category, and custgrp, which essentially has the matrices (product×product2) associating each pair of products further dimensioned by season, category and custgrp.

From these similarity, confidence, and support cubes, multilevel and multidimensional (ML/MD) top-N recommended lists of products for a given customer can be generated based on CF, RF, and the combination thereof: neighborhood oriented rule mining.

To reduce data sparsity, the volume cube formation is based on low dimension representation using product hierarchy and singular value decomposition (SVD) techniques. For example, TV may be used as a single product to cover all TV's of different brands and screen sizes. Based on the availability of dimension hierarchies, the sparsity level (percent of null cells over all cells) of the volume cube can be reduced. By discarding the customers with very few shopping activities, the sparsity level of the similarity cube and rule related cubes (confidence cube and support cube) can be reduced as well.

Here, the OLAP engine 20 is not solely used as a data analysis tool, but instead, as a scalable computation engine for data processing (e.g., generating the numerous types of cubes) and data mining. From the performance point of view, it supports indexed caching, reduces database access dramatically and extends main memory based computation. From the functionality point of view, it allows taking recommendation to the ML/MD space.

In the recommendation system 100 of the present invention, the volume cube and similarity cube are pre-calculated and updated upon receipt of new data in batch. Neighborhood association rules and recommendations are generated instantly. Generating a recommendation is similar to deriving a view, or answering a query. In response to a request, the recommendation system 100 is able to deliver multiple recommendations simultaneously in all the dimensions and their combinations. However, for efficiency, typically only the recommendation local to a specific feature scope identified by certain dimension values, such as in 'electronics' category, 'summer' season, is requested at a time. This enables the limiting of the base elements of computation. Mining association rules in the neighborhood of a given customer represents a further step of such base reduction, making on-line recommendation realistic.

The recommendation system 100 of the present invention provides the following basic recommendation functions:
rec_cf0 target_cust min_sim min_fq (Get recommended products based on flat CF),
rec_rf0 target_cust min_conf min_supt (Get recommended products based on Flat RF),
rec_fff0 target_cust min_sim min_fq min_conf min_supt (Get recommended products based on Flat CF and Neighborhood RF),
rec_cf target_cust min_sim min_fq (Get recommended products based on MD CF),
rec_rf target_cust min_conf min_supt (Get recommended products based on MD RF), and
rec_fff target_cust min_sim min_fq min_conf min_supt (Get recommended products based on MD CF and Neighborhood RF).

The arguments of the above recommendation functions stand for the following:
target_cust: target customer,
min_sim: similarity threshold for the neighborhood,
min_fq: the rate of customers in the neighborhood who bought each product,
min_conf: rule confidence threshold, and
min_supt: rule support threshold (with modifier).

These recommendation functions operate on sub-cubes, from a single slice (matrix) to a dice including multiple slices. For example,
  limit season to all; limit category to all; limit custgrp to 'Men';
  rec_cf c11 0.25 0.20
means applying the recommendation function rec_fff based on multiple slices of the corresponding cubes covering all the seasons and categories, but
  limit season to 'Summer', limit category to 'Office', limit custgrp to 'Men'
  rec_cf c11 0.25 0.20
only refers to one slice (dimensioned by customer and customer2) of the similarity cube.

Collaborative Filtering (CF) is used to recommend products to a targeted customer based on the opinions of the set of other customers known as neighbors. These neighbors commonly agree on a set of products, by rating them similarly or by buying them commonly. For instance, if a VCR is bought by "more than enough" neighbors of a customer but not by himself, then VCR will be recommended to him. Conceptually, neighborhoods are determined using a similarity matrix (customer×customer2). The neighbors of a customer, $C_i$, are those whose degree of similarity (normalized between 0-1) with $C_i$ is greater than a given threshold. Neighborhood can also be determined based on iteratively reset center. Given customer $C_i$, CF based recommendation is to identify the list of his neighbors $<C_k, \ldots, C_m>$ ordered by similarity measures $s(C_k, C_i) \ldots s(C_k, C_i)$; to find and sort the most frequently purchased items within that neighborhood; and then to recommend to $C_i$ the top-N items not bought by $C_i$, each with a normalized degree of recommendation, $u_{cp}$, such as $p_1$:0.85; $p_2$:0.75; etc., whereas $p_1$ and $p_2$ are items or products.

CF-based recommendation using a large, flat similarity matrix suffers from both accuracy and scalability. As stated above, a man in winter may be recommended with a woman's cloth for summer, if his shopping history in purchasing other products (e.g. office supply, electronics, etc.) is similar to some women. To avoid such misleading analysis, the recommendation system 100 of the present invention dimensions the similarity matrix based on some features (e.g., season, category, etc.), to allow customers to be compared in specific scopes. In different scopes, customers' similarity may be different (e.g. similar in buying products of category "Electronics", but not "Cloths"; similar in summer but not in winter). The neighborhoods of a customer may be different. The products recommended to the customer may be different.

To support multilevel and multidimensional CF, the recommendation system 100 of the present invention dimensions the similarity matrix by category, season, and custgrp to form the following similarity cube:
  S (customer, customer2, category, season, custgrp).
The similarity Cube S is computed using the OLAP engine 20 from the volume cube:
  V (customer, product, season).
But the similarity cube S can be dimensioned differently from the volume cube V. Each cell of similarity cube S represents the similarity of a pair of corresponding sub-cubes (slices or dices) of volume cube V. For example, the cell:
  S [customer '$C_1$', customer2 '$C_2$', season 'Spring', category 'Electronics', custgrp 'Men']
holds the similarity measure of the following two sub-cubes of volume cube V with the value of customer dimension as '$C_1$' and '$C_2$' respectively, the value of season dimension as 'Spring', and the values of product dimension range over those in the 'Electronics' category.

The task for generating the similarity cube S from the volume cube V is to map each cell of similarity cube S to two sub-cubes of volume cube V, and to compare these two sub-cubes to return a single similarity measure as the value of that cell. Formally speaking, to derive a similarity cube $S[D_s]$, with a set of dimensions $D_s$, from the volume cube V[D] with a set of dimensions D, requires that each cell e of similarity cube S can be mapped to two sub-cubes of V (say $V_1$ and $V_2$), i.e., $e[D_s] \rightarrow (V_1[D'], V_2[D'])$ where D' is a subset of D. These two sub-cubes are then compared, generating a single similarity measure v: $<V_1, V_2> \rightarrow [0,1]$ as the value of cell e.

In the recommendation system 100 of the present invention, for a targeted customer $C_i$, his neighborhood is dimensioned by season, category and custgrp. The top-N recommended items in one or multiple scopes identified by these dimension values are generated based on the similarity cube in the steps described next.

First, from a corresponding slice (a customer by customer matrix) of the similarity cube, identify the neighborhood of $C_i$, i.e., a list of customers $<C_k, \ldots, C_m>$ ordered by similarity measures $s(C_k, C_i) \ldots s(C_k, C_i)$. The neighborhood can be determined based on fixed center or iteratively reset center.

Then, within customer $C_i$'s neighborhood, find and sort the most frequently purchased items. Finally, recommend to $C_i$ the top-N items found above and not bought by $C_i$ with normalized ratings, the degree of CF based recommendation, $u_{cf}$, such as $p_1$:0.85; $p_2$:0.75; etc. For product p, $u_{cf}(p)$ is the ratio of total number of customers in the neighborhood who bought p to the number of customers in the neighborhood.

Figure 2A:
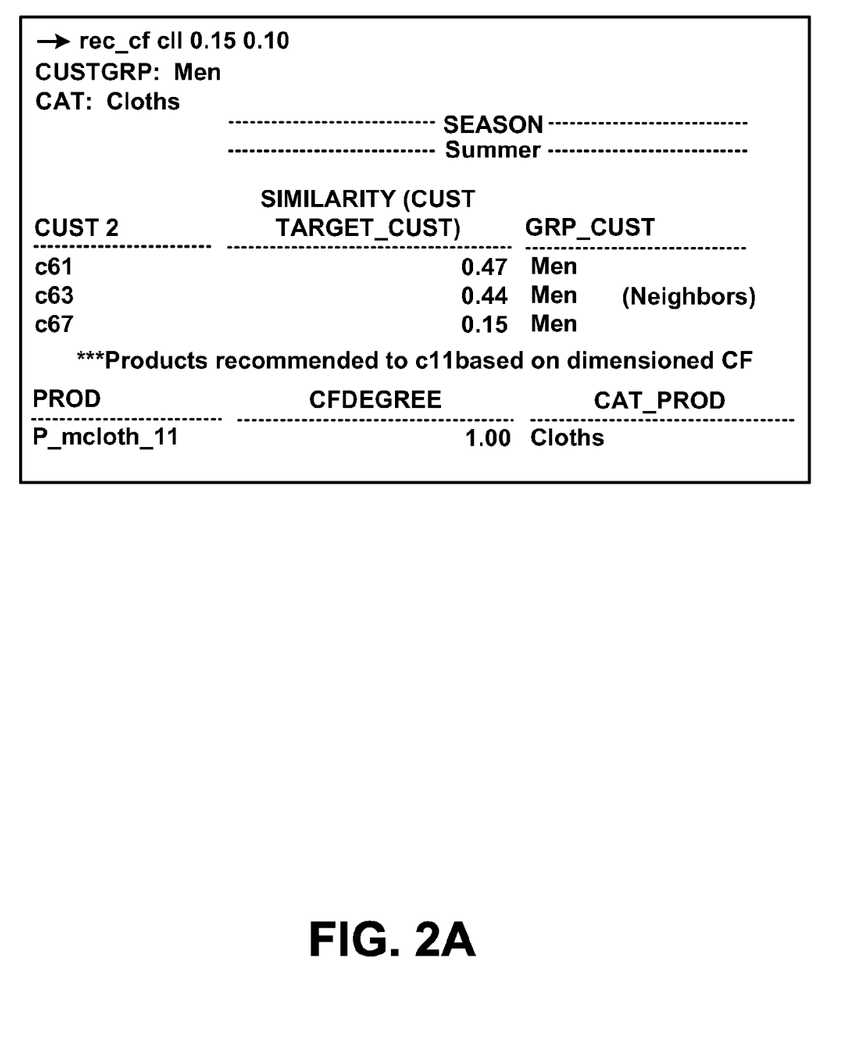
FIGS. 2A and 2B illustrates the difference of neighborhoods and recommended products in different scopes corresponding to different values of season, cat (category) and custgrp dimensions in accordance with an embodiment of the present invention, showing dimensioned CF analysis.
Figure 2B:
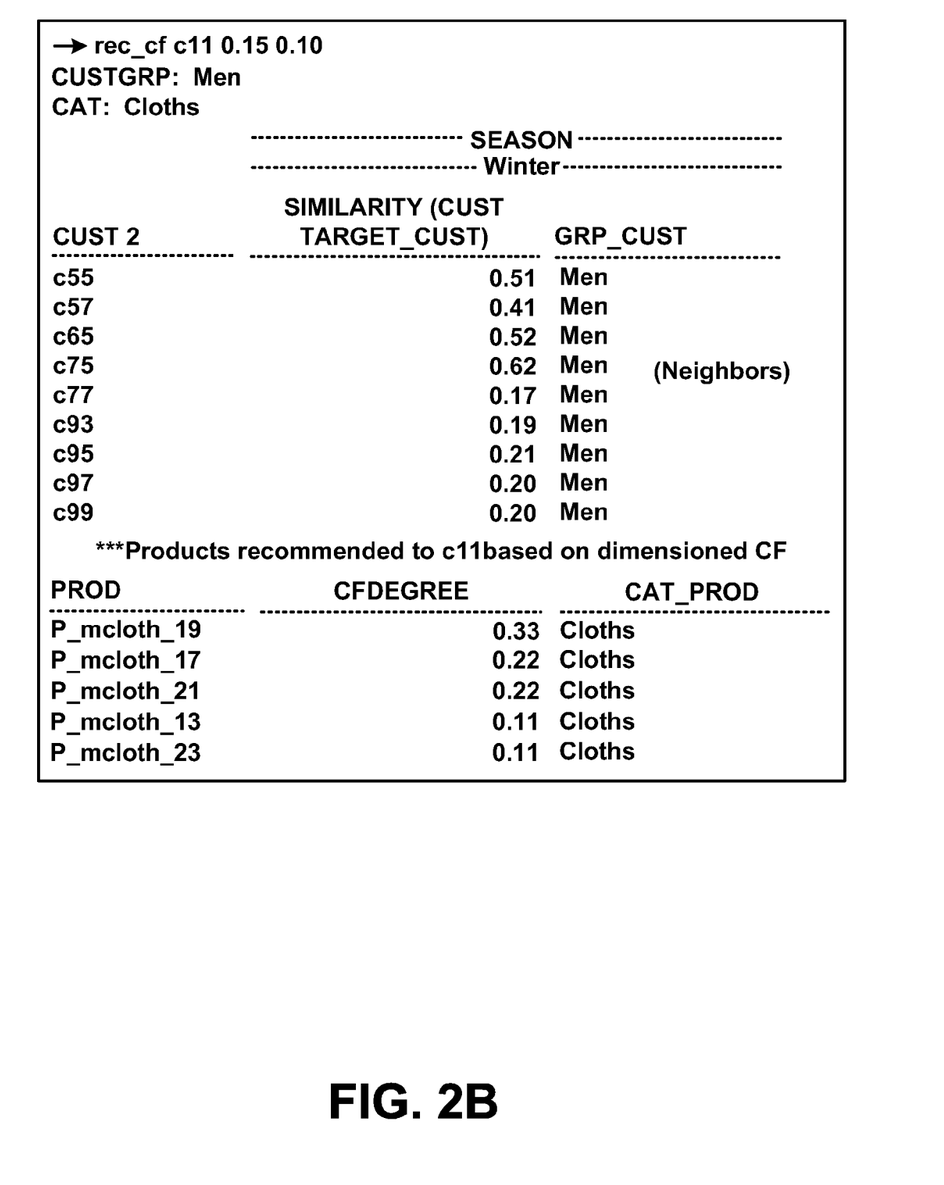

FIGS. 2A and 2B illustrates the difference of neighborhoods and recommended products in different scopes corresponding to different values of season, cat (category) and custgrp dimensions in accordance with an embodiment of the present invention, showing dimensioned CF analysis. It can be seen that under cat='cloths', custgrp='men', for the given customer '$c_{11}$', his neighborhood and the products recommended to him are different in season='summer' (FIG. 2A) and in season='winter' (FIG. 2B).

Dimensioning recommendations can provide not only enhanced accuracy but also enhanced scalability. As the similarity matrices are dimensioned, each matrix involves smaller amount of customers and products purchased by those customers, and all the matrices can be computed in parallel. In this way the computation cost for customer similarity can be significantly reduced. In addition, forming the volume cube based on low dimension representation using product hierarchy and SVD techniques, reduces the sparsity level of the similarity cube.

Association rules provide a quantitative measurement of the association relationships between facts. Association rule mining aims at inferring such relationships from transaction summary data. For example, a cross-sale association rule is used to answer "how many customers who bought product X, also bought product Y in spring?" An association rule can be simply expressed by B: X->Y, where B is the base, X is its antecedent, and Y is its consequent and they are conjunctive predicates. There is a confidence and a support related to each association rule. In the above example, customers form the base of rules. If 80% of the customers who bought X also bought Y, and only 10% of all the customers bought both, the association rule has confidence 80% and support 10%. Given application-specific minimum support and confidence thresholds, a rule is considered strong if it satisfies these thresholds. Note that the above rules are based on customers rather than transactions.

RF-based recommendations are generated as follows. Assume that TV->VCR is a strong rule (with confidence and support over certain thresholds) based on customers. If a customer bought TV, meaning that he supports this rule, then he will be recommended to buy VCR, if he hasn't bought yet.

Mining cross-sale association rules based on a large number of customers and products can be very costly. Since not everyone buys everything, many products are not or only weakly associated under the cross-sale relationship. Using SVD and product hierarchy can reduce data sparsity (e.g., treating a TV as a single product, ignoring brand, screen size, etc). However, mining rules over a large number of customers can still be ineffective and inaccurate, since for a particular customer, many rules may potentially be irrelevant.

To solve this problem, the recommendation system 100 of the present invention first provides multilevel and multidimensional association rules to underlie RF based recommendation, and further introduces neighborhood oriented multilevel and multidimensional association rules.

In the cross-sale association rule:
[x Customers: buy_product(x, 'A')->buy_product(x, 'B')]
customer is the base dimension, product is the item dimension. To make this rule a multidimensional rule, the recommendation system 100 of the present invention adds some underlying feature dimensions such as season, category, and custgrp. Then a multidimensional rule may be specified as:
[x Customers: buy_product(x, 'A')->buy_product(x, 'B')]
|season='Spring', custgrp='Men'.

Further, a feature may be represented at multiple levels. For example, the following rule is at a higher level of time that covers all the seasons:
[x Customers: buy_product(x, 'A') buy_product(x, 'B')]
|custgrp='Women'.

In ML/MD rules, the base (customers) of rules is also dimensioned, which allows us to generate rules in smaller scopes for efficiency and accuracy.

For a rule B: X->Y, the cardinality of the base elements that match X is denoted by $|X_B|$. The confidence of rule X->Y in B, can be calculated as $s_B(X$->$Y)=|X_B \wedge Y_B|/|X_B|$, ranging from 0 to 1. The support of rule X->Y in B, can be calculated by $O_B(X$->$Y)=|X_B \wedge Y_B|/|B|$. For simplicity, when the base B is understood from the context, it is dropped from the subscripts. In the conventional rule representation, confidence, support, as well as the count measure $|X \wedge Y|$ used for deriving confidence and support, are expressible by X×Y matrices. Representing ML/MD rules consists in dimensioning these X×Y matrices by other feature dimensions.

In the recommendation system 100 of the present invention, customer is selected as the base dimension of cross-sale association rules. The basic form of rules is product->product2, expressible by the set of product×product2 matrices, where product2 is the mirror dimension of product. To elevate "flat" cross-sale association rules to ML/MD is to dimension the product×product2 matrices by the feature dimensions season, category and custgrp, the recommendation system 100 of the present invention introduces the following cubes: volume cube V, association cube $C_a$, population Cube $C_p$, base cube $C_b$, Confidence cube $C_f$, and support cube $C_s$.

Volume cube, V (customer, season, product), has multidimensional counts for deriving association rules. A volume cube is sufficient for deriving multidimensional $|X \wedge Y|$, i.e., the instances of rule, if it has a base dimension that represent the base of the rule, and the association conditions for qualifying $X \wedge Y$, are definable.

Association cube, $C_a$ (product, product2, season, category, custgrp), maintains dimensioned $|X \wedge Y|$, i.e., the number of base elements that satisfy $X \wedge Y$. Association cube $C_a$ may be dimensioned differently from Volume cube V.

Population cube $C_p$ (product, season, category, custgrp) is used to measure dimensioned $|X|$, i.e., the numbers of base elements satisfying X.

Base cube $C_b$ (season, category, custgrp) is used to represent dimensioned $|B|$. Note that Base cube $C_b$ is not aggregated from Population cube $C_p$, as purchase of multiple products may come from the same customer.

Confidence cube $C_f$ (product, product2, season, category, custgrp) and support cube $C_s$ (product, product2, season, category, custgrp) are used for representing dimensioned $|X \wedge Y|/|X|$, and $|X \wedge Y|/|B|$ respectively. They have the same dimensions as the association cube $C_a$.

Cube based association rules are represented by cubes and generated in terms of cube manipulations. The basic task of OLAP based association rule mining is to convert a volume cube into association rule related cubes. For example, cross-sale association rule mining may be performed as follows.

First, load data and roll up data cubes to form the volume cube V with dimensions customer, product and season. Then, for each season, category, and custgrp, identify the sets of corresponding customers and products. Next, populate a sub-cube of the base cube $C_b$ by the counts of customers, a sub-cube of the population cube $C_p$ based on antecedent condition V (product p1)>0. Then, using the same ranging mechanism, calculating the association cube $C_a$ for each pair of product, product2, based on condition V (product p1)>0 and V (product2 p2)>0. Furthermore, derive confidence cube $C_f$ and support cube $C_s$ by the cell-wise operations $C_f = C_a/C_p$ and $C_s = C_a/C_b$, whereas a support modifier may be introduced.

The top-N recommended items for a given customer, $C_i$, in one or more scopes identified by the values of given underlying dimensions (e.g., category, season and custgrp), can be provided by the recommendation system 100 of the present invention using ML/MD (multilevel and multidimensional) RF analysis as follows.

First, find all rules supported by $C_i$. Next, sort the items representing the consequent of these rules (RHS) by confidence or a utility function of confidence and support, as the normalized degree of recommendation ($u_{rf}$), such as $p_1$:0.90; $p_2$:0.81. For product p, $u_{rf}(p)$ is the combination of confidence c and support s, defined as $(c)(s^k)$ where $0<=k<=1$, such that if s=0 then $u_{rf}(p)=0$, and if s=1 then $u_{rf}(p)=c$. The smaller the value of k, the less impact of s is made to $u_{rf}(p)$; and in the extreme case where k=0, $u_{rf}(p)=c$. In the recommendation system 100 of the present invention, k was assigned 0.5. Then, recommend to $C_i$ the top-N items that he did not buy.

Figure 3A:
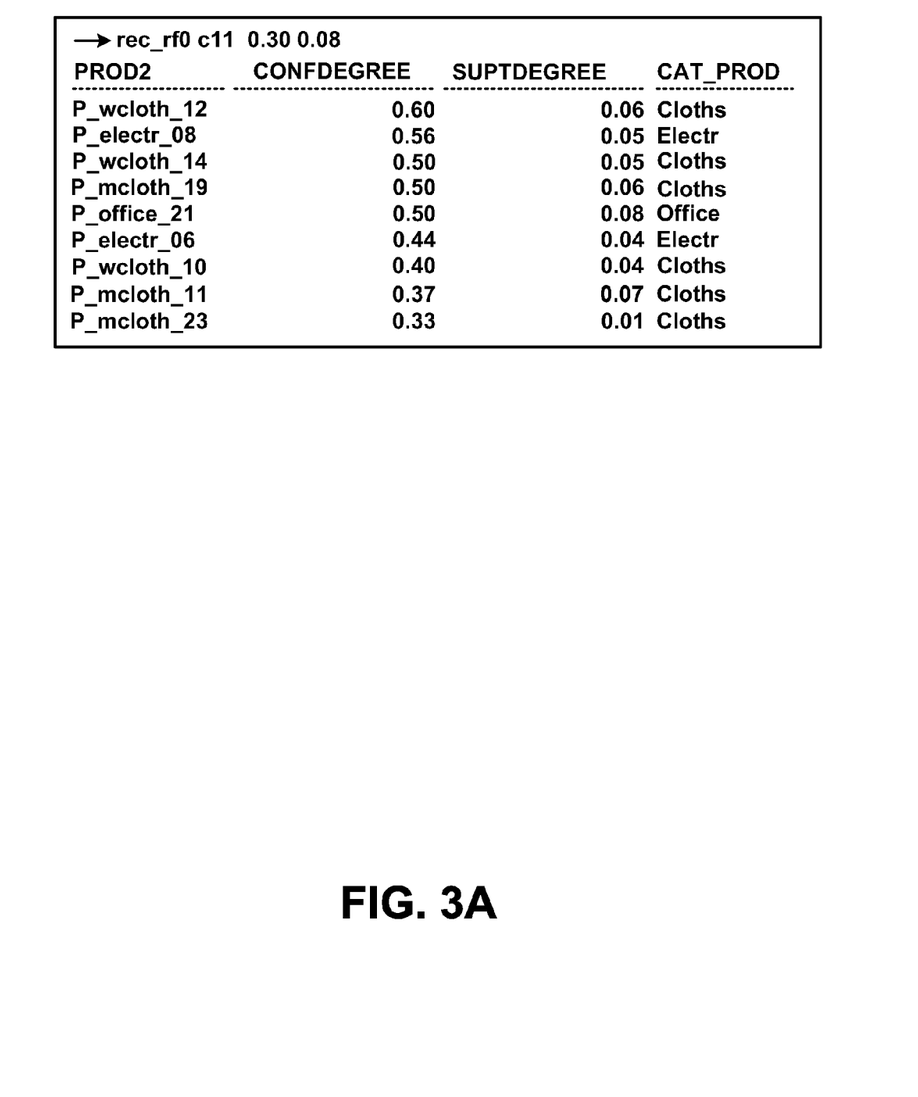
FIGS. 3A and 3B shows how a recommendation based on dimensioned RF differs from a recommendation based on "flat" RF in accordance with an embodiment of the present invention.
Figure 3B:
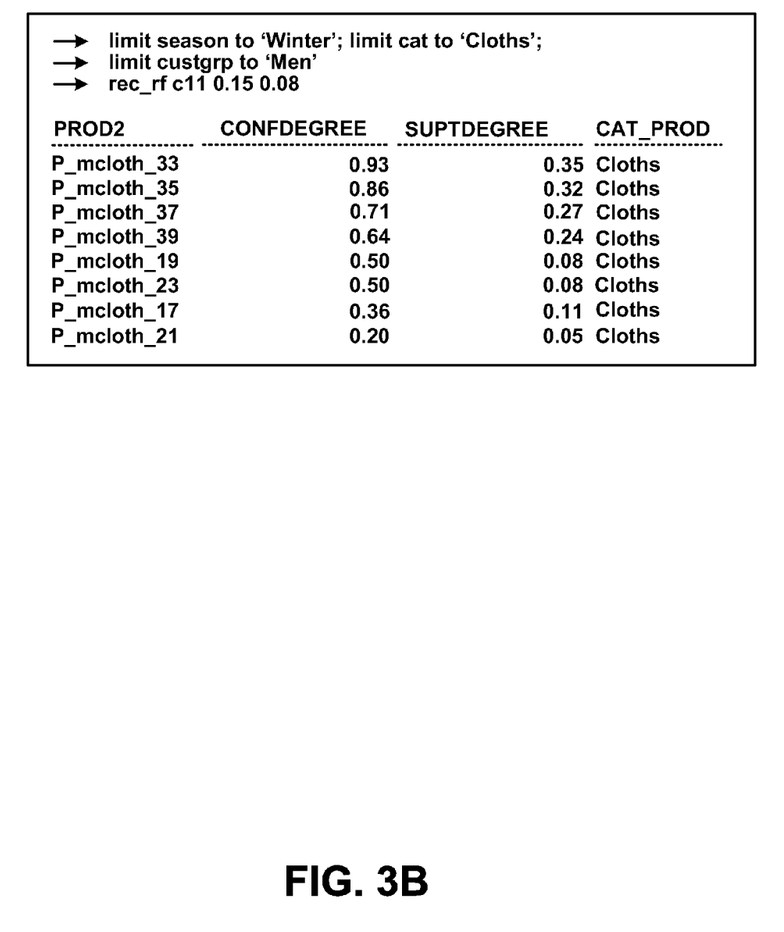

FIGS. 3A and 3B shows how a recommendation based on dimensioned RF differs from a recommendation based on "flat" RF in accordance with an embodiment of the present invention. While FIG. 3A depicts a recommendation based on "flat" RF, FIG. 3B depicts a recommendation based on dimensioned RF (for season='winter', category='cloths' and custgrp='men'). It can be seen that customer $c_{11}$ is a man. However, p_wcloth_12 and p_wcloth_12 are actually woman's summer cloths but recommended to $c_{11}$ in summer in flat CF based recommendation (FIG. 3A). This occurs because in general $c_{11}$ has similar shopping behavior with some women in buying other products such as electronics and office supplies. It can also be seen that some man's cloths e.g., p_mcloth_21, etc, are missing from the non-dimensioned recommendation list (FIG. 3A) but are captured in the dimensioned RF recommendation (FIG. 3B). In general, recommendations based on dimensioned RF are local to specific feature scopes and therefore more relevant. In contrast, without dimensioning, some rules relevant to a specific situation may be missed due to the low support in the general case; some rules irrelevant to a specific situation may pass the minimum threshold due to the supports in other cases. Further, rule mining can be made more effective under dimensioned bases with reduced sizes, and made concurrently over those bases.

However, even in dimensioned scopes, generating rules over all the involved customers and the products they bought still can be ineffective. The recommendation system 100 of the present invention solves this problem by using neighborhood association rule mining, leading to integration of ML/MD CF and ML/MD RF based recommendation in personalized scopes, i.e. personal neighborhoods.

IF-based recommendation is based on personal preference (e.g., "likes Sony brand"), represented either by item rating or by purchasing history. Through shopping behavior analysis, a profile is generated for each individual customer. In fact, such profiles represented partially by the volume cubes, is already used in the recommendation system 100 of the present invention. Personal preference can also be used to recommend additional items (e.g., other Sony products), or adjust the degree of recommendation (e.g., a Sony product may be ranked higher in a recommendation list).

Personal preferences can also be dimensioned, for example, John likes "Sony" brand of electronics, but "GE" brand for electrical appliances, and therefore represented by cubes (the above volume cube V is a simple example). ML/MD personal preference combined with ML/MD CF and ML/MD RF allows the recommendation system 100 of the present invention to generate more accurate and relevant recommendations.

Generating recommendations on a general basis is expensive and inaccurate. The recommendation system 100 of the present invention focuses on specializing and reducing the base of prediction to solve this problem. The recommendation system 100 of the present invention supports multilevel and multidimensional (ML/MD) recommendation, which allows the recommendation system 100 of the present invention to provide more focused recommendations in dimensioned scopes. Moreover, the recommendation system 100 of the present invention supports neighborhood-oriented association rule mining, i.e., mining rules in the personalized scope: the neighborhood of a given customer identified using the result of collaborative filtering (CF).

Mining association rules over a large amount of customers and products is expensive, and for a particular customer, the resulting rules over all the customers are less focused. However, as the neighbors of a given customer $C_i$ have similar shopping behavior with $C_i$, the association rules generated within the neighborhood, are more relevant to $C_i$. Since the base for generating neighborhood oriented association rules is relatively small, the efficiency of rule mining can be significantly enhanced.

For example, given a customer $C_i$, assume that a recommendation list including "TV-stand" is generated based on ML/MD CF, and that in $C_i$'s neighborhood; TV->TV-stand is a strong rule. Then, the result of ML/MD CF-based recommendation may be adjusted by the result of neighborhood-oriented association rules. For example, if $C_i$ has bought a TV, then a TV-stand may be ranked higher in the recommendation list.

RF-based recommendation relies on item-to-item (i2i) correlation; CF-based recommendation relies on customer-to-customer (c2c) correlation. Mining rules in the neighborhood of a given customer identified using the result of ML/MD CF provides an integration of CF and RF based recommendation approaches. Since the neighborhoods of a customer are dimensioned (e.g., different in summer and in winter), the recommendation system 100 of the present invention integrates CF and RF in personalized scopes (neighborhoods) in the ML/MD space.

Figure 4:
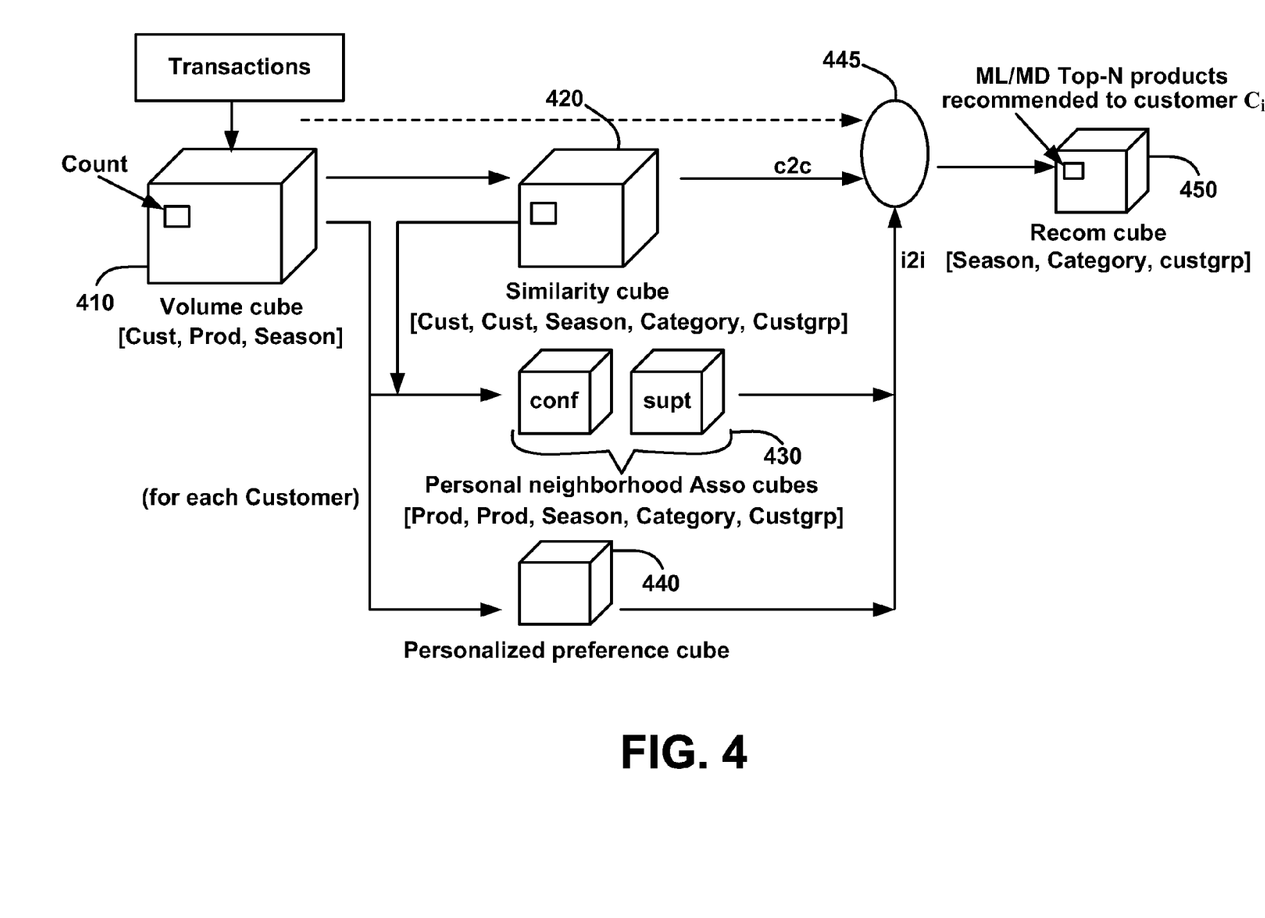
FIG. 4 illustrates generation of a recommendation based on the integration of ML/MD CF and neighborhood oriented ML/MD RF in accordance with an embodiment of the present invention.

FIG. 4 illustrates generation of a recommendation based on the integration of ML/MD CF and neighborhood oriented ML/MD RF in accordance with an embodiment of the present invention. At 410, the volume cube is generated. At 420, the similarity cube is generated. Continuing at 420, given a customer $C_i'$, his neighborhood is identified using the similarity cube with the selected underlying dimension values; and a ML/MD CF-based recommendation list is generated. At 430, a neighborhood oriented volume cube over the customers in $C_i$'s neighborhood is derived, as a sub-cube of the volume cube. Continuing at 430, neighborhood oriented association rules based on the neighborhood volume cube are mined. At 440, the personalized preference cube is generated based on ML/MD IF recommendation.

Moreover at 445, the result of ML/MD CF-based recommendation is adjusted according to the neighborhood oriented association rules and the personalized preference cube to generate the recommendation cube 450. In one embodiment, the degree of ML/MD CF and neighborhood ML/MD RF based recommendation for product p, $u_{rec}(p)$, is a weighted combination of $u_{cf}(p)$ and $u_{rf}(p)$ defined as (r) $[u_{cf}(p)]+(1-r)[u_{rf}(p)]$, whereas $0<=r<=1$ is the ratio of the strengths of CF and RF based recommendations that are to be considered. When r is assigned 0.5, the results of CF and RF based recommendations are weighted equally.

Figure 5A:
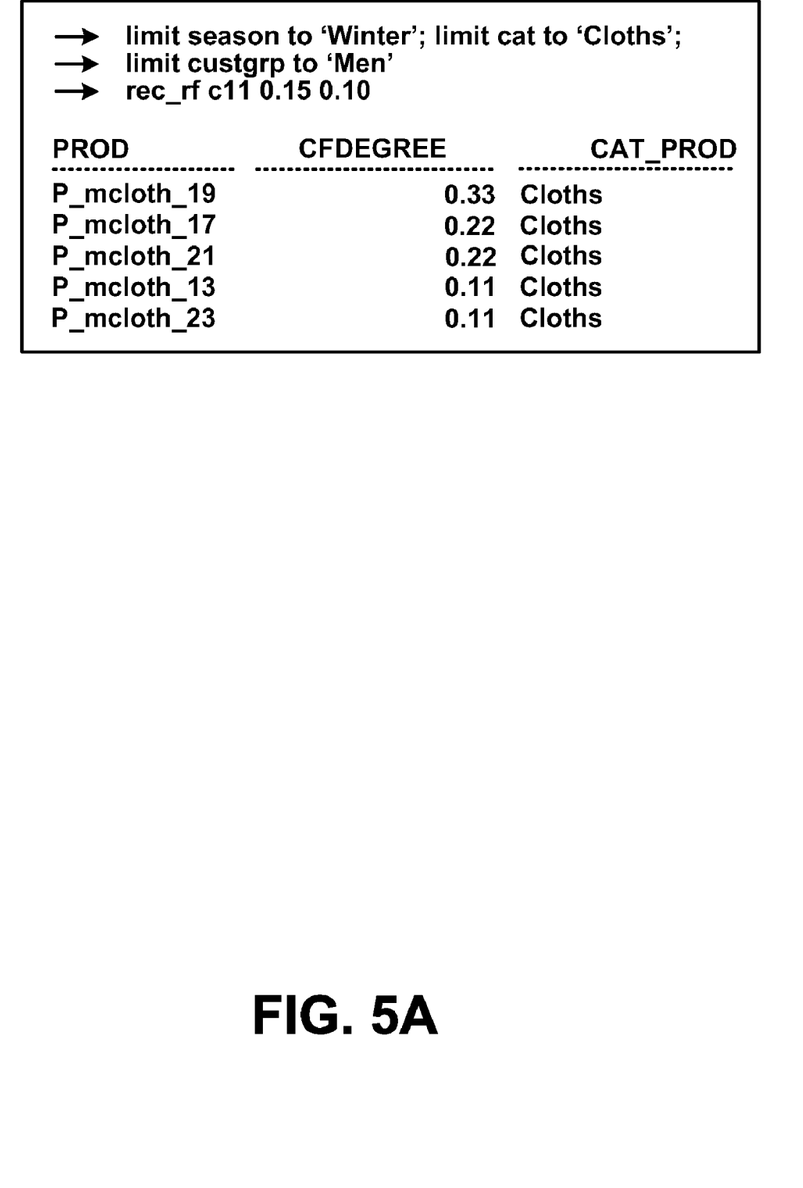
FIGS. 5A, 5B, and 5C illustrate the dimensioned recommendations in accordance with an embodiment of the present invention.
Figure 5B:
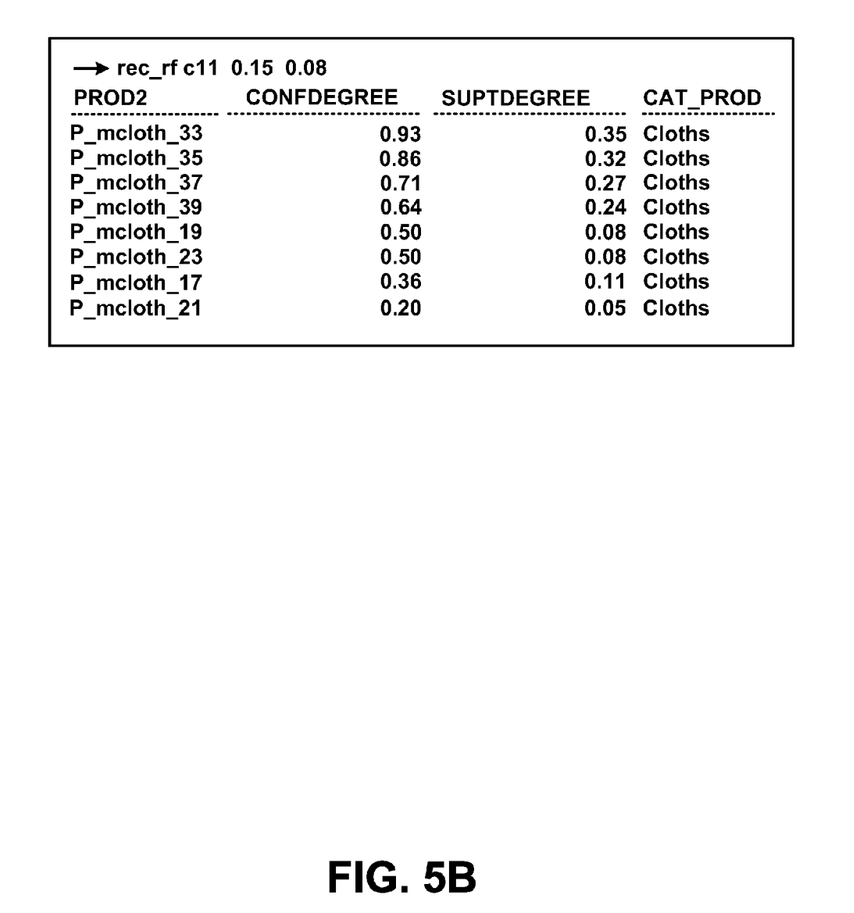
Figure 5C:
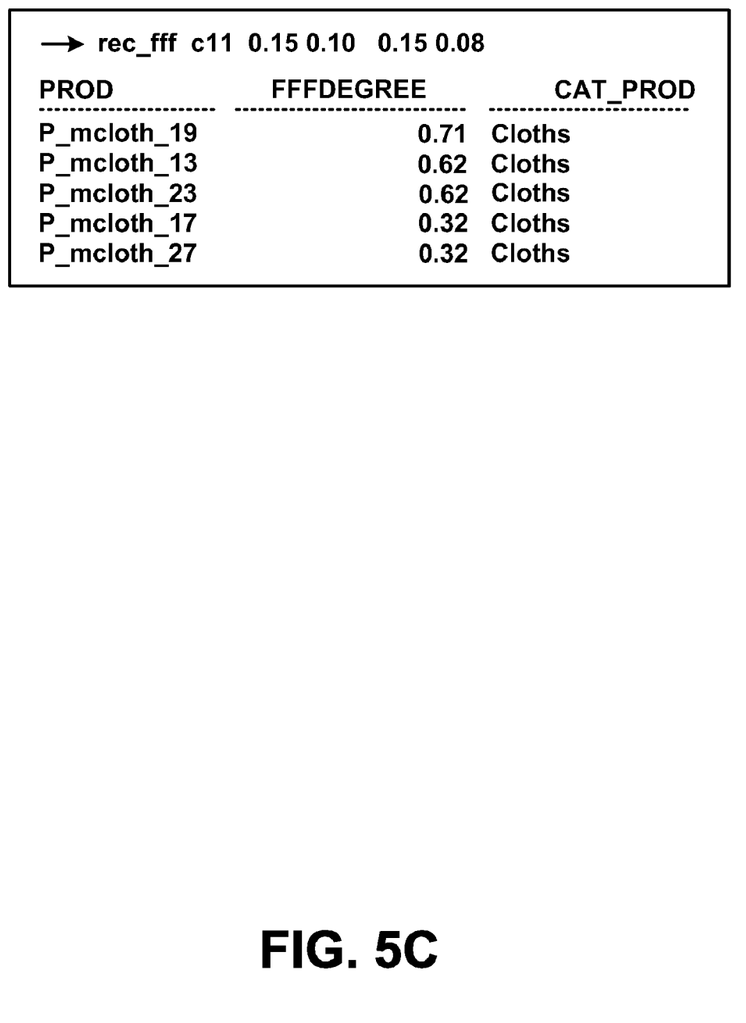

FIGS. 5A, 5B, and 5C illustrate the dimensioned recommendations in accordance with an embodiment of the present invention. In FIG. 5A, the dimensioned recommendation is generated by ML/MD CF with dimension values season='winter', cat(egory)='cloths', custgrp='men'. In FIG. 5B, the dimensioned recommendation is generated by ML/MD RF with dimension values season='winter', cat(egory)='cloths', custgrp='men'. Moreover, in FIG. 5C, the dimensioned recommendation is generated by ML/MD CF combined with neighborhood-oriented ML/MD RF with dimension values season='winter', cat(egory)='cloths', custgrp='men'. As shown in FIGS. 5A and 5B, the dimensioned recommendations have different emphasizes, one focuses on collaborative customer behavior (FIG. 5A) and the other focuses on causal relation of purchasing (FIG. 5B). Hence, their results are different in the recommended items and their order (degree of recommendation). The recommended items generated in FIG. 5C are very different from the ones in FIG. 5B, since non-neighborhood association rules, although dimensioned, have their base including those customers who are not in the neighborhood of the target customer.

Figure 6A:
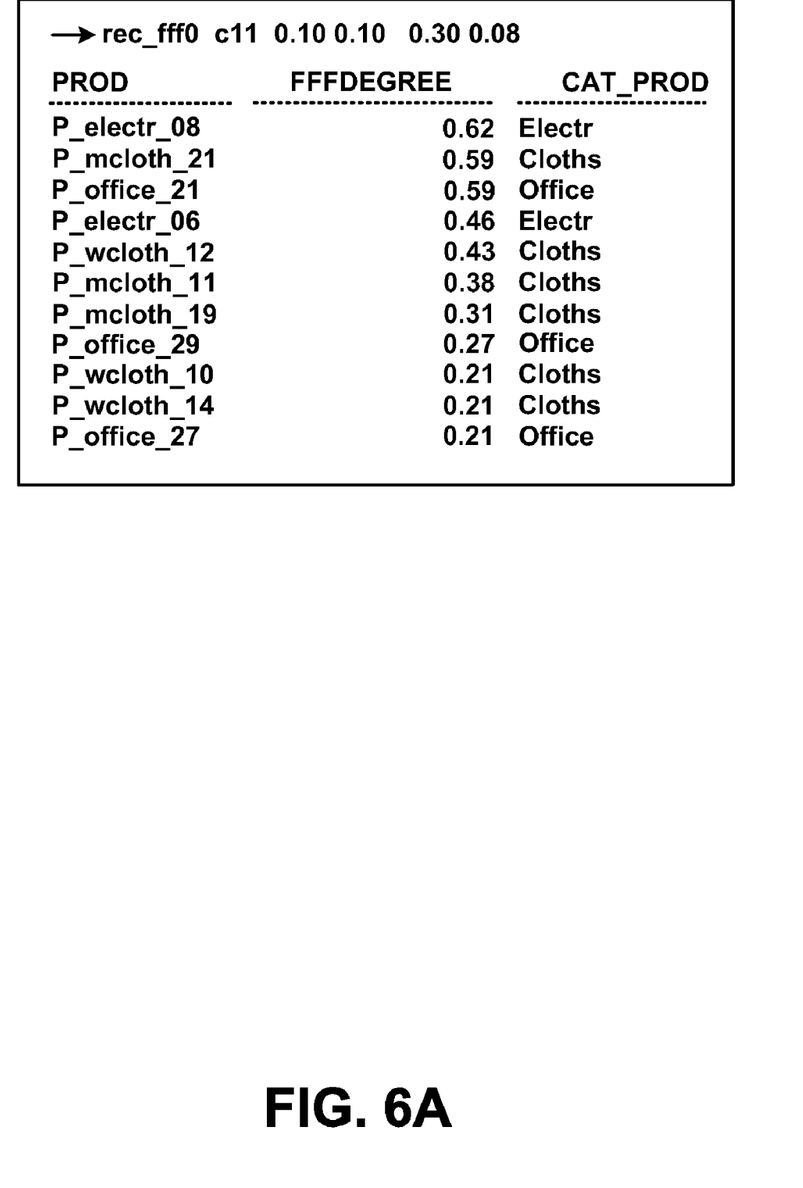
FIGS. 6A and 6B illustrate flat recommendations and dimensioned recommendations in accordance with an embodiment of the present invention.
Figure 6B:
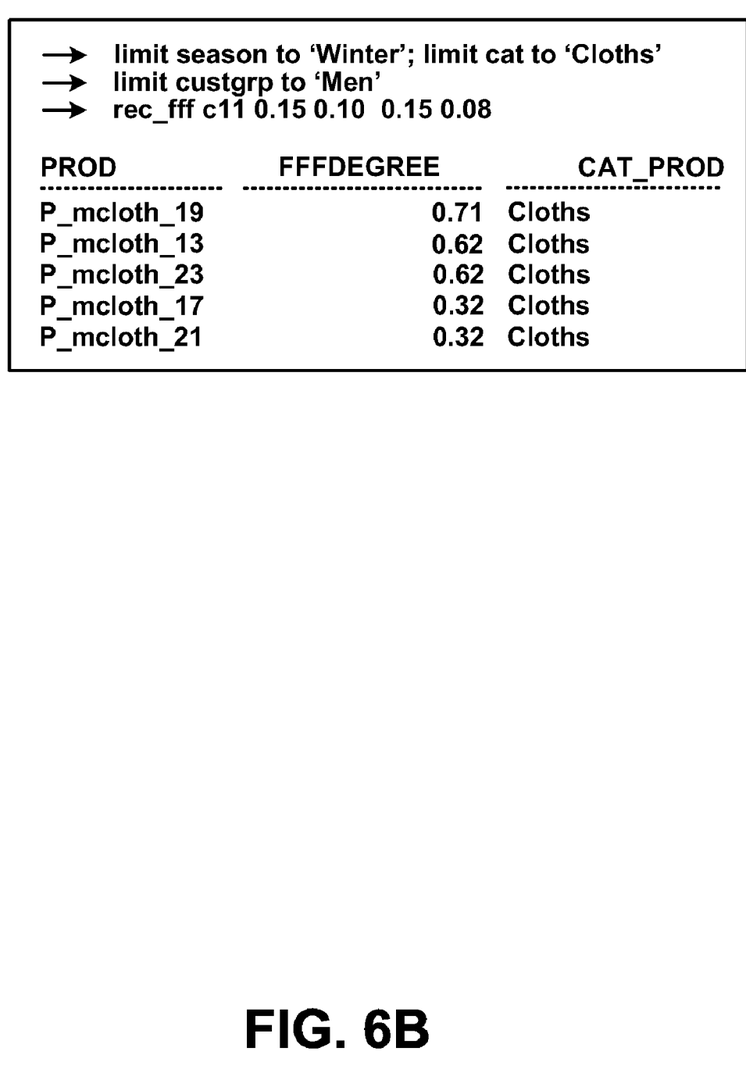

FIGS. 6A and 6B illustrate flat recommendations and dimensioned recommendations in accordance with an embodiment of the present invention. A flat recommendation based on flat CF and neighborhood flat RF is depicted in FIG. 6A. A dimensioned recommendation based on ML/MD CF and neighborhood ML/MD RF is shown in FIG. 6B. As illustrated in FIG. 6A, since the neighborhood is formed on a non-dimensioned base, the neighborhood association rules are not all relevant. For example, a woman's cloth, p_wcloth_12, is still recommended to the customer $c_{11}$ who is a man. Applying this approach to dimensioned scopes eliminates such problems.

In general, CF-based recommendation approach focuses on the correlation of customers (c2c), or "neighbors preference". RF-based recommendation approach focuses on the correlation of items (i2i). The combination of them allows generating recommendations based on both c2c and i2i correlations. Mining association rules in a personalized neighborhood further enhances the accuracy of RF-based recommendation, reduces the base of rule generation thus improves its efficiency. Personal preference can be used to make further adjustment to the results generated by the CF-based and neighborhood RF-based recommendation approaches. Integrating RF, CF and IF based recommendation techniques in multilevel and multidimensional personalized scopes, allows the recommendation system 100 of the present invention to gain further enhanced accuracy and efficiency.

In an embodiment, the present invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer-implemented method of generating a recommendation list of products to a customer, said method comprising:

using OLAP (On-Line Analytical Processing) to analyze raw data in a multilevel and multidimensional manner;

applying a plurality of filtering processes to said raw data, as a part of said analyzing, to generate a plurality of preliminary recommendation lists at said computer;

adjusting a first preliminary recommendation list according to association rules mined within a neighborhood of said customer, wherein said first preliminary recommendation list is one of the preliminary recommendation lists;

and generating said recommendation list based on said plurality of preliminary recommendation lists.

2. The computer-implemented method as recited in claim 1 wherein said plurality of filtering processes includes collaborative filtering (CF).

3. The computer-implemented method as recited in claim 2 further comprising generating a volume cube and a similarity cube at said computer.

4. The computer-implemented method as recited in claim 1 wherein said plurality of filtering processes includes information filtering (IF).

5. The computer-implemented method as recited in claim 1 wherein said plurality of filtering processes includes association rule based filtering (RF).

6. The computer-implemented method as recited in claim 5 further comprising generating a volume cube, an association cube, a population cube, a base cube, a confidence cube, and a support cube at said computer.

7. The computer-implemented method as recited in claim 1 further comprising:

identifying a neighborhood of said customer using multilevel and multidimensional collaborative filtering at said computer;

mining association rules within said neighborhood at said computer;

generating a first preliminary recommendation list based on multilevel and multidimensional collaborative filtering at said computer; and adjusting said first preliminary recommendation list according to said neighborhood mined association rules at said computer.

8. A computer-readable storage medium comprising computer-executable instructions stored therein for performing a method of generating a recommendation list of products to a customer, said method comprising:

using OLAP (On-Line Analytical Processing) to analyze raw data in a multilevel and multidimensional manner at a computer;

applying a plurality of filtering processes to said raw data, as a part of said analyzing, to generate a plurality of preliminary recommendation lists at said computer;

adjusting a first preliminary recommendation list according to association rules mined within a neighborhood of said customer, wherein said first preliminary recommendation list is one of the preliminary recommendation lists;

and generating said recommendation list based on said plurality of preliminary recommendation lists at said computer.

9. The computer-readable storage medium as recited in claim 8 wherein said plurality of filtering processes includes collaborative filtering (CF).

10. The computer-readable storage medium as recited in claim 9 wherein said method further comprises generating a volume cube and a similarity cube.

11. The computer-readable storage medium as recited in claim 8 wherein said plurality of filtering processes includes information filtering (IF).

12. The computer-readable storage medium as recited in claim 8 wherein said plurality of filtering processes includes association rule based filtering (RF).

13. The computer-readable storage medium as recited in claim 12 wherein said method further comprises generating a volume cube, an association cube, a population cube, a base cube, a confidence cube, and a support cube.

14. The computer-readable storage medium as recited in claim 8 wherein said method further comprises:
   identifying a neighborhood of said customer using multilevel and multidimensional collaborative filtering;
   mining association rules within said neighborhood;
   generating a first preliminary recommendation list based on multilevel and multidimensional collaborative filtering; and
   adjusting said first preliminary recommendation list according to said neighborhood mined association rules.

15. A recommendation system comprising:
   a data warehouse for storing raw data representing purchases of products by customers;
   a server using OLAP (On-Line Analytical Processing) for analyzing said raw data in a multilevel and multidimensional manner to generate a recommendation list of products to a customer, wherein said server applies a plurality of filtering processes to said raw data;
   said server adjusting a first preliminary recommendation list according to association rules mined within a neighborhood of said customer, wherein said first preliminary recommendation list is one of the preliminary recommendation lists and
   a computer having stored therein a multidimensional database for storing data cubes processed by said server, wherein said multidimensional database is controlled by said server.

16. The recommendation system as recited in claim 15 wherein said plurality of filtering processes includes collaborative filtering (CF).

17. The recommendation system as recited in claim 16 wherein said server generates a volume cube and a similarity cube.

18. The recommendation system as recited in claim 15 wherein said plurality of filtering processes includes information filtering (IF).

19. The recommendation system as recited in claim 15 wherein said plurality of filtering processes includes association rule based filtering (RF).

20. The recommendation system as recited in claim 19 wherein said server generates a volume cube, an association cube, a population cube, a base cube, a confidence cube, and a support cube.

* * * * *